(12) United States Patent
Hiruta et al.

(10) Patent No.: US 11,578,984 B2
(45) Date of Patent: Feb. 14, 2023

(54) VEHICLE CONTROL DEVICE AND PROGRAM

(71) Applicant: HONDA MOTOR CO., LTD., Tokyo (JP)

(72) Inventors: Shigenori Hiruta, Wako (JP); Takashi Mori, Wako (JP); Hiroyuki Hayashi, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 986 days.

(21) Appl. No.: 16/354,350

(22) Filed: Mar. 15, 2019

(65) Prior Publication Data

US 2019/0293439 A1 Sep. 26, 2019

(30) Foreign Application Priority Data

Mar. 22, 2018 (JP) .............................. JP2018-055307

(51) Int. Cl.
*G01C 21/34* (2006.01)
*G06F 21/35* (2013.01)
(Continued)

(52) U.S. Cl.
CPC ......... *G01C 21/3438* (2013.01); *G06F 21/35* (2013.01); *H04L 9/08* (2013.01); *H04W 4/025* (2013.01); *H04W 4/40* (2018.02)

(58) Field of Classification Search
CPC .......... G06F 21/30; G06F 21/31; G06F 21/35; H04W 4/02; H04W 4/025; H04W 4/024; H04L 9/08; H04L 9/083; H04L 9/3226
See application file for complete search history.

(56) References Cited

U.S. PATENT DOCUMENTS

| 2014/0270172 A1* | 9/2014 | Peirce | H04L 9/0819 |
| | | | 380/270 |
| 2016/0150066 A1* | 5/2016 | Yae | H04W 4/80 |
| | | | 455/41.2 |
| 2017/0055108 A1 | 2/2017 | Jeon | |

FOREIGN PATENT DOCUMENTS

| JP | 2004-088339 | 3/2004 |
| JP | 2006-005744 | 1/2006 |

(Continued)

OTHER PUBLICATIONS

Japanese Office Action for Japanese Patent Application No. 2018-055307 dated Oct. 5, 2021.

(Continued)

*Primary Examiner* — Aaron L Troost
(74) *Attorney, Agent, or Firm* — Amin, Turocy & Watson, LLP

(57) ABSTRACT

A vehicle control device is provided. The vehicle control device includes a terminal device authentication unit that determines whether a terminal device of a user registered as a user of a vehicle, in advance, is present around or within the vehicle. The vehicle control device also includes a communication unit that communicates with the terminal device. Also included in the vehicle control device is a control unit that causes a display device provided in the vehicle to output a screen for setting communication between the communication unit and the terminal device. The display device outputs the screen in a case where it is determined by the terminal device authentication unit that the terminal device is present and the display device is started up.

8 Claims, 8 Drawing Sheets

(51) Int. Cl.
*H04W 4/02* (2018.01)
*H04W 4/40* (2018.01)
*H04L 9/08* (2006.01)

(56) References Cited

FOREIGN PATENT DOCUMENTS

| | | |
|---|---|---|
| JP | 2010-074745 | 4/2010 |
| JP | 2012-118848 | 6/2012 |
| JP | 2016-153280 | 8/2016 |
| JP | 2016-220098 | 12/2016 |
| JP | 2017-216734 | 12/2017 |
| JP | 2002-096715 | 4/2022 |

OTHER PUBLICATIONS

Japanese Office Action for Japanese Patent Application No. 2018-055307 dated Apr. 26, 2022.
Chinese Office Action for Chinese Patent Application No. 201910202083.5 dated Apr. 29, 2022.
Japanese Decision for Dismissal of Amendment for Japanese Patent Application No. 2018-055307 dated Oct. 11, 2022.

* cited by examiner

PAIRING IS REQUIRED FOR USING HFT.
PLEASE SELECT A SMARTPHONE TO BE USED
FROM THE FOLLOWING DEVICES.

TERMINAL DEVICE 5-1

TERMINAL DEVICE 5-2

TERMINAL DEVICE 5-3

(b)

P710

PAIRING IS REQUIRED FOR USING HFT.

TERMINAL DEVICE 5-1

WILL YOU PAIR THIS SMARTPHONE?

Yes    No

VEHICLE CONTROL DEVICE AND PROGRAM

CROSS-REFERENCE TO RELATED APPLICATION

Priority is claimed Japanese Patent Application No. 2018-055307, file Mar. 22, 2018, the content of which is incorporated herein by reference.

BACKGROUND OF THE INVENTION

Field of the Invention

The present invention relates to a vehicle control device and a program.

Description of Related Art

In recent years, there have been vehicles which are equipped with a car navigation device as an in-vehicle accessory, and have improved convenience. Further, the association of a portable terminal device such as a smartphone with a car navigation device makes it possible to reproduce music data stored in the terminal device, to use a hands-free telephone function of using a communication function of the terminal device, or the like, which leads to a further increase in convenience. In addition, the use of a portable terminal device as a key of a vehicle or the like is known (see Japanese Unexamined Patent Application, First Publication No. 2004-88339). In using such a function, it may be necessary to perform a pairing process for making it possible for an in-vehicle instrument such as a car navigation device and a terminal device to communicate with each other.

SUMMARY OF THE INVENTION

However, in the related art, it has been difficult to perform an operation for pairing a portable terminal device and an in-vehicle instrument such as a car navigation device in a state in which communication is possible.

The present invention was contrived in view of such circumstances, and one object thereof is to provide a vehicle control device and a program that make it possible for a portable terminal device and an in-vehicle control device to communicate with each other in a simpler procedure.

In order to solve the above problem and achieve such an object, the present invention adopts the following aspects.

(1) According to an aspect of the present invention, there is provided a vehicle control device including: a terminal device authentication unit configured to determine whether a terminal device of a user registered as a user of a vehicle in advance is present around or within the vehicle; a communication unit configured to communicate with the terminal device; and a control unit configured to cause a display device provided in the vehicle to output a screen for setting communication between the communication unit and the terminal device in a case where it is determined by the terminal device authentication unit that the terminal device is present and the display device is started up.

(2) In the aspect (1), the terminal device authentication unit may authenticate the terminal device in a case where the terminal device authentication unit and the terminal device are present within a predetermined distance.

(3) In the aspect (1) or (2), the terminal device authentication unit may determine that authentication of the terminal device has succeeded in a case where first key data acquired from the terminal device and second key data acquired from a management device are coincident with each other.

(4) In the aspect (3), the communication unit may be started up in a case where it is determined by the terminal device authentication unit that the authentication of the terminal device has succeeded, and communicate with the terminal device.

(5) In the aspect (3) or (4), in a case where the authentication has succeeded, the terminal device authentication unit may transmit information required for setting communication between the communication unit and the terminal device, acquired from the management device or the terminal device, to the control unit.

(6) In the aspects (3) to (5), the control unit may cause a storage unit to store information relating to a terminal device of a user of the vehicle acquired from the management device or the terminal device, and cause the display device provided in the vehicle to output a screen for setting communication with a terminal device, corresponding to information relating to terminal information read out from the storage unit, to the corresponding terminal device in a case where it is determined by the terminal device authentication unit that the terminal device is present and the display device is started up.

(7) In the aspect (6), the terminal device authentication unit may acquire the information relating to a terminal device of a user of the vehicle, registered on the basis of request from a user in the management device, from the management device, and cause the storage unit to store the acquired information.

(8) In the aspect (6) or (7), the control unit may delete the terminal information of the terminal device, displayed on the display device from the storage unit, on the basis of information indicating that a user's right to use the terminal device acquired from the management device is invalidated.

(9) In the aspects (6) to (8), the management device may manage data relating to a schedule to use the vehicle, the information relating to the terminal information may include the managed data relating to a schedule to use the vehicle, and in a case where it is determined by the terminal device authentication unit that the terminal device is present and the display device provided in the vehicle is started up, the control unit may extract terminal information in which a range until an elapse of a predetermined period from the startup overlaps a period of a reservation to use the vehicle from the terminal information read out from the storage unit, and cause the display device to output a screen for setting communication with a terminal device, corresponding to information relating to the extracted terminal information, to the corresponding terminal device.

(10) According to an aspect of the present invention, there is provided a non-transitory computer-readable recording medium storing a program causing a terminal device capable of communicating with a vehicle to transmit first key data to an instrument of the vehicle with approach to the vehicle, and causing a terminal display unit of the terminal device to output a screen for setting communication between a display control device and the terminal device on the basis of authentication success information obtained in accordance with transmission of the first key data.

According to the aspects (1) to (10), it is possible for a portable terminal device and an in-vehicle control device to communicate with each other in a simpler procedure.

According to the aspects (2) to (9), further, the control unit can communicate with the terminal device through the success of authentication, and the reliability of a vehicle control system is further improved.

According to the aspect (6), further, since a screen for setting communication with a terminal device specified in advance is output to the display device, the control unit can cause the terminal device authentication unit and the terminal device to communicate with each other without requiring any additional time or effort.

According to the aspect (7), further, it is possible to simplify an operation for writing information in the storage unit.

According to the aspect (8), further, it is possible to remove information relating to the terminal device 5 for which a use right is invalidated from a target displayed on the display device 451.

According to the aspect (9), further, it is possible to apply the vehicle control system to an aspect in which the number of reservations in a use schedule becomes larger.

BRIEF DESCRIPTION OF THE DRAWINGS

FIG. 6 is a diagram illustrating transition of a display screen displayed by the display unit during a pairing process of a second modification example of the first embodiment.

DETAILED DESCRIPTION OF THE INVENTION

Hereinafter, embodiments of a vehicle control device and a program of the present invention will be described with reference to the accompanying drawings. The vehicle control device controls a vehicle on the basis of digitized key data. The vehicle control device may be applied to one or both of an owned utility form in which a vehicle is owned by an individual user and a shared utility form in which a vehicle is provided by a rental car company, a ride share service, or the like. In the following description, it is assumed that the vehicle control device is applied to both of them. A vehicle control system using the vehicle control device permits a registered user to use a vehicle. Meanwhile, it is assumed that in the case of the owned utility form, it is not necessary to perform an operation relating to registration every time a vehicle is used, and that in the case of the shared utility form, an operation relating to registration is to be performed every time a vehicle is used.

First Embodiment

Figure 1:
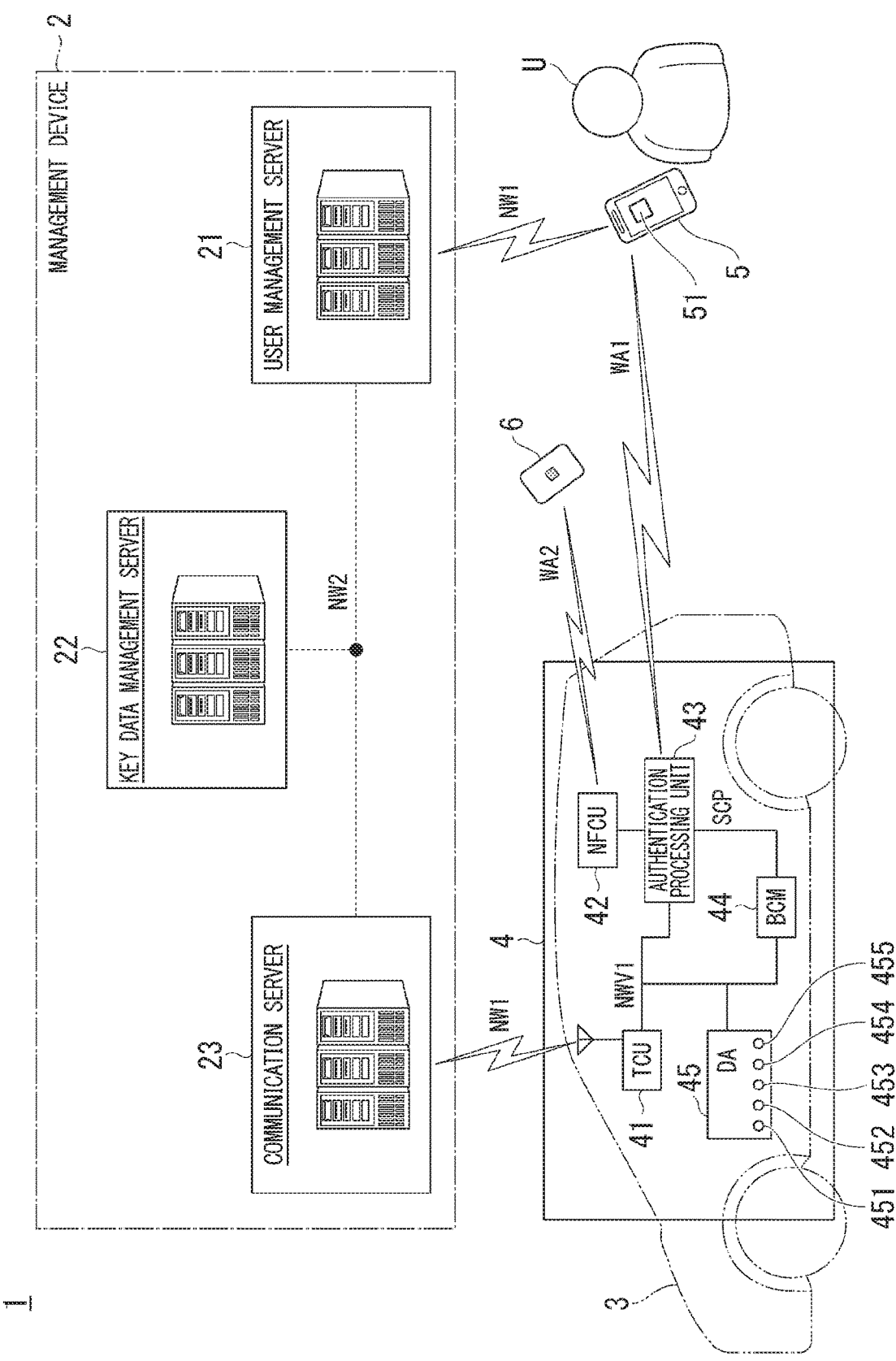
FIG. 1 is a configuration diagram of a vehicle control system including a vehicle control device according to a first embodiment.

FIG. 1 is a configuration diagram of a vehicle control system including a vehicle control device according to a first embodiment.

A vehicle control system 1 includes a management device 2, a vehicle instrument (an example of a vehicle control device) 4 mounted in a vehicle 3, and a terminal device 5.

The terminal device 5 is a portable terminal device which is carried by a user U who uses the vehicle 3. The terminal device 5 is, for example, a smartphone, a cellular phone, a tablet terminal, or the like. The terminal device 5 accepts an operation of the user U, and acquires key data issued by the management device 2.

The vehicle instrument 4 controls locking and unlocking of a door by the terminal device 5 or an NFC card 6 having the same key data stored therein being used as a key. The vehicle instrument 4 performs startup control or the like by the terminal device 5 having the same key data stored therein being used as a key.

For example, in a situation in which the terminal device 5 is not able to be used, the NFC card 6 is used instead of the terminal device 5. Situations in which the terminal device 5 is not able to be used include a situation in which the vehicle instrument 4 is not able to acquire key data issued by the management device 2 due to a failure of the terminal device 5, the movement of the vehicle 3 or the terminal device 5 out of a communication range, or the like. Meanwhile, the vehicle instrument 4 may restrict functions which are performed in a case where the NFC card 6 has been used to functions which are performed in a case where the terminal device 5 has been used. For example, in a case where the NFC card 6 is used, startup control of the vehicle 3 may be performed by using a general key or a smart key.

A typical communication mode which is applied to the vehicle control system 1 will be described below. The management device 2, the vehicle instrument 4, and the terminal device 5 of the vehicle control system 1 can communicate with each other using a network NW1. The network NW1 is, for example, a cellular wireless network, a wireless LAN, or the like. Further, the vehicle instrument 4 and the terminal device 5 can communicate with each other through wireless communication WA1. A communication standard for realizing the wireless communication WA1 may be any of Bluetooth (registered trademark), a short-range wireless communication standard such as near field communication (NFC), an infrared communication standard, or the like. The vehicle instrument 4 and the NFC card 6 can communicate with each other through, for example, wireless communication WA2 based on NFC. The vehicle instrument 4 and a smart key (not shown) can also communicate with each other through, for example, the wireless communication WA2.

Hereinafter, each unit of the vehicle control system 1 will be described in order.

The management device 2 includes, for example, a user management server 21, a key data management server 22, and a communication server 23.

For example, the user management server 21, the key data management server 22, and the communication server 23 are configured as separate computer devices so as to enhance security. The user management server 21, the key data management server 22, and the communication server 23 are connected to a network NW2, and can communicate with each other at any timing.

The user management server 21 communicates with the terminal device 5. The user management server 21 acquires, for example, a request from the terminal device 5 based on an operation of the user U, and performs a user authentication process relating to the terminal device 5, a process relating to an issue request (generation request) of key data, a relay process of issued key data K1, or the like. For example, the user management server 21 manages information relating to the user U and information relating to the vehicle 3 which is permitted to be used by the user U as terminal information to be described later, and gives key data of the vehicle 3 for which the user U has applied to the user U.

For example, the terminal information includes identification information of the user U, identification information (such as a UUID) of the terminal device 5, a device name (such as a nickname of the terminal device), a device attribute, identification information of the vehicle 3, a device name of the vehicle 3 (such as, for example, a name of the vehicle instrument 4), and various information (such as, for example, a valid period of the key data K1, a place scheduled for starting use of the vehicle 3, a place scheduled for ending use of the vehicle 3, identification information of functions used in the vehicle 3, the presence or absence of use of HFT, or use completion of the vehicle 3) in the case of the shared utility form. The above UUID may be allocated to a simple pairing process functional unit 51 of the terminal device 5 to be described later. The key data K1 is generated by the key data management server 22 to be described later.

Meanwhile, the terminal information is registered from the terminal device 5, other terminal devices (not shown), or the like. Depending on a utility form, the items may be registered by the user U operating the terminal device 5, or some or all of the items may be registered from the other terminal devices or the like. An example of the form of being registered from other terminal devices or the like includes the following form.

For example, in the case of the owned utility form, a person in sales or the like registers the items from a terminal device kept in a sales outlet of the vehicle 3.

In the case of the shared utility form, information relating to a vehicle is registered from a terminal device kept in a company, a rental car store, or a ride share service provider. The information relating to a vehicle among the items is registered from other terminal devices, and thus it is possible to reduce an operation of the user U.

Meanwhile, in the case of the shared utility form, the user management server 21 further manages the reservation status of the vehicle 3. For example, the user management server 21 extracts time (spare time) for which the vehicle 3 is not reserved, and allocates a new reservation from the spare time. In that case, the user management server 21 generates terminal information relating to the reservation for each reservation, and writes the generated information in a storage unit of the user management server 21 to perform the management. The user management server 21 transmits the terminal information to the vehicle 3 through the communication server 23.

Meanwhile, in a case where use of the vehicle 3 is complete (the vehicle is returned in the case of a rental car), the user management server 21 activates an item (flag) indicating "use completion of the vehicle 3" in the terminal information. For example, this process is performed periodically or after the elapse of a predetermined time from the return of the vehicle 3.

The key data management server 22 manages key data. The key data management server 22 acquires a request for generation of key data, based on a request for issue of key data from the terminal device 5, from the user management server 21, generates key data K1 and K2, and transmits the key data to each address.

The key data K1 and K2 correspond to each other. The key data K1 and K2 may be the same data, or may have a predetermined correspondence relation. For example, the key data K1 is relayed by the user management server 21 and is transmitted to the terminal device 5. The key data K2 is relayed by the communication server 23 and is transmitted to the in-vehicle instrument 4.

Meanwhile, the key data management server 22 may encrypt and transmit one or both of the key data K1 and K2. The encrypted key data is decoded at a stage until it is collated with the vehicle 3. In the following description, the encryption process and the decryption process will not be described.

The communication server 23 communicates with the vehicle 3. The communication server 23 acquires terminal information relating to the terminal device 5 from the user management server 21, acquires the key data K2 from the key data management server 22, and transmits the data and information to the vehicle 3.

Next, the vehicle instrument 4 will be described. The vehicle instrument 4 controls at least unlocking and locking of the door (not shown) of the vehicle 3, startup of a driving unit (not shown), use of various accessories provided in the vehicle 3, or the like. The vehicle instrument 4, for example, applies the result of a first authentication process to control of locking and unlocking of the door of the vehicle 3, and applies the result of a second authentication process to control of startup of the vehicle 3. Meanwhile, the first authentication process and the second authentication process are sequentially performed in a stepwise manner. The details of each authentication process will be described later.

The vehicle instrument 4 includes, for example, a communication processing unit 41, an NFC communication processing unit 42, an authentication processing unit 43 (terminal device authentication unit), a vehicle power supply control unit 44, and a display control device 45.

The communication processing unit 41, the NFC communication processing unit 42, the authentication processing unit 43, the vehicle power supply control unit 44, and the display control device 45 are connected to, for example, a network NWV1 within the vehicle 3, and communicate with each other at any timing on the basis of a protocol such as a CAN. The authentication processing unit 43 and the vehicle power supply control unit 44 are connected to each other through a serial communication path SCP.

The communication processing unit 41 acquires the terminal information of the terminal device 5 and the key data K2 from the communication server 23 using the network NW1, and transmits the data and information to the authentication processing unit 43 to be described later.

The NFC communication processing unit 42 detects an NFC device such as the NFC card 6 or a smart key using the wireless communication WA2, and communicates with the detected device. In a case where an NFC device associated with the vehicle 3 in advance is identified to be present within a range in which communication with the NFC communication processing unit 42 is possible, the NFC communication processing unit 42 sends information relating to the identified NFC device to the authentication processing unit 43.

The authentication processing unit 43 determines whether the terminal device 5 of the user U registered as a user of the vehicle 3 in advance is present around (outside) or within the vehicle 3, and performs the first authentication process on the terminal device 5 and the NFC device. The wording "around (outside) the vehicle 3" means outside the vehicle 3, and within a range in which communication with the vehicle instrument 4 is possible using any of the wireless communication WA1 and the wireless communication WA2. The first authentication process is a process of verifying a correspondence relation between the key data K1 and the key data K2 on the basis of the key data K1 stored in the terminal device 5 or the NFC device and the key data K2 transmitted from the management device 2. A timing at which the authentication processing unit 43 performs the first authentication process is shown by sign UAP1 in FIG. 3 to be described later.

Meanwhile, the authentication processing unit 43 receives the terminal information relating to the terminal device 5 and the key data K2 from the communication processing unit 41 in advance of the execution of the first authentication process, and stores the data and information in a storage unit of the authentication processing unit 43. Thereby, data relating to the terminal information and the key data K2 is stored in the storage unit of the authentication processing unit 43 before the user U uses the vehicle 3.

The process of storing data relating to the terminal information and the key data K2 in the storage unit of the authentication processing unit 43 is performed at a stage where a person in sales or the like registers information from a terminal device kept in a sales outlet of the vehicle 3, for example, in the case of the owned utility form. In the case of the shared utility form, the process is performed at a stage where the user U registers information in order to use a new vehicle 3.

The authentication processing unit 43 further detects the terminal device 5 or the NFC device which is a target for authentication using a communication function unit (not shown) of the authentication processing unit 43 in advance of the execution of the first authentication process, and communicates with the detected device. The communication function unit of the authentication processing unit 43 is provided in, for example, the door of the vehicle 3 or a hatch on the rear of the vehicle 3, within the vehicle, or the like.

When succeeding in the authentication process, the authentication processing unit 43 unlocks a door in order to permit use of the vehicle 3, notifies each functional unit within the vehicle 3 of the success of the first authentication process, and permits acquiring a request relating to startup of the vehicle 3 from the terminal device 5. For example, the authentication processing unit 43 acquires the request through a communication path CP1 using the wireless communication WA1, and sends information relating to the request to the display control device 45.

Further, the authentication processing unit 43 functions as a wireless communication unit of communication based on a request of the display control device 45 to be described later, and forms a communication path CP2 using the wireless communication WA1 between the terminal device 5 and the communication unit. The specific details will be described later.

Next, the vehicle power supply control unit 44 will be described. The vehicle power supply control unit 44 selects a supply destination of power within the vehicle 3. The vehicle power supply control unit 44 selects a supply destination of power within the vehicle 3 in accordance with any of a state (state of IG_OFF) in which the generation of thrust force of the vehicle 3 is limited or a state (state of IG_ON) in which the generation of the thrust force is permitted.

For example, functional units activated by the vehicle 3 in both the state of IG_ON and the state of IG_OFF include the communication processing unit 41, the NFC communication processing unit 42, the authentication processing unit 43, and the vehicle power supply control unit 44. Meanwhile, the display control device 45 is not included among them. The vehicle power supply control unit 44 performs control to activate the display control device 45 in the case of transition to at least the state of IG_ON.

Next, the display control device 45 will be described. The display control device 45 is disposed at a position where the user U who has boarded the vehicle 3 can perform an operation. For example, the display control device 45 may be a portion of a navigation device, or may be a display device different in application from the navigation device.

For example, the display control device 45 includes a display unit 451 (display device), an operating unit 452, a communication unit 453, a storage unit 454, and a control unit 455. The control unit 455 of the display control device 45 controls each unit of the display control device 45, further communicates with the outside portion of the display control device 45 through the communication unit 453 and the authentication processing unit 43, and writes data acquired from the outside in the storage unit 454. For example, the control unit 455 causes the display unit 451 to display information of which the user U who has boarded the vehicle 3 is notified, and acquires information relating to content of an operation of the user U performed on the operating unit 452. The communication unit 453 is connected to the network NWV1 and the serial communication path SCP. The communication unit 453 is not provided with a wireless communication function unit for using the wireless communication WA1, but is capable of communication using the wireless communication WA1 by using the communication function unit of the authentication processing unit 43.

The display control device 45 acquires information used in the authentication process of the terminal device 5 from the authentication processing unit 43, and performs the second authentication process of the terminal device 5 that performs communication through the communication function unit of the authentication processing unit 43. In a case where the terminal device 5 is identified to be registered in advance, the display control device 45 then acquires a request relating to startup of the vehicle 3 from the terminal device 5 through the second authentication process, and starts up the vehicle 3 in accordance with the request. The specific details will be described later.

Figure 2:
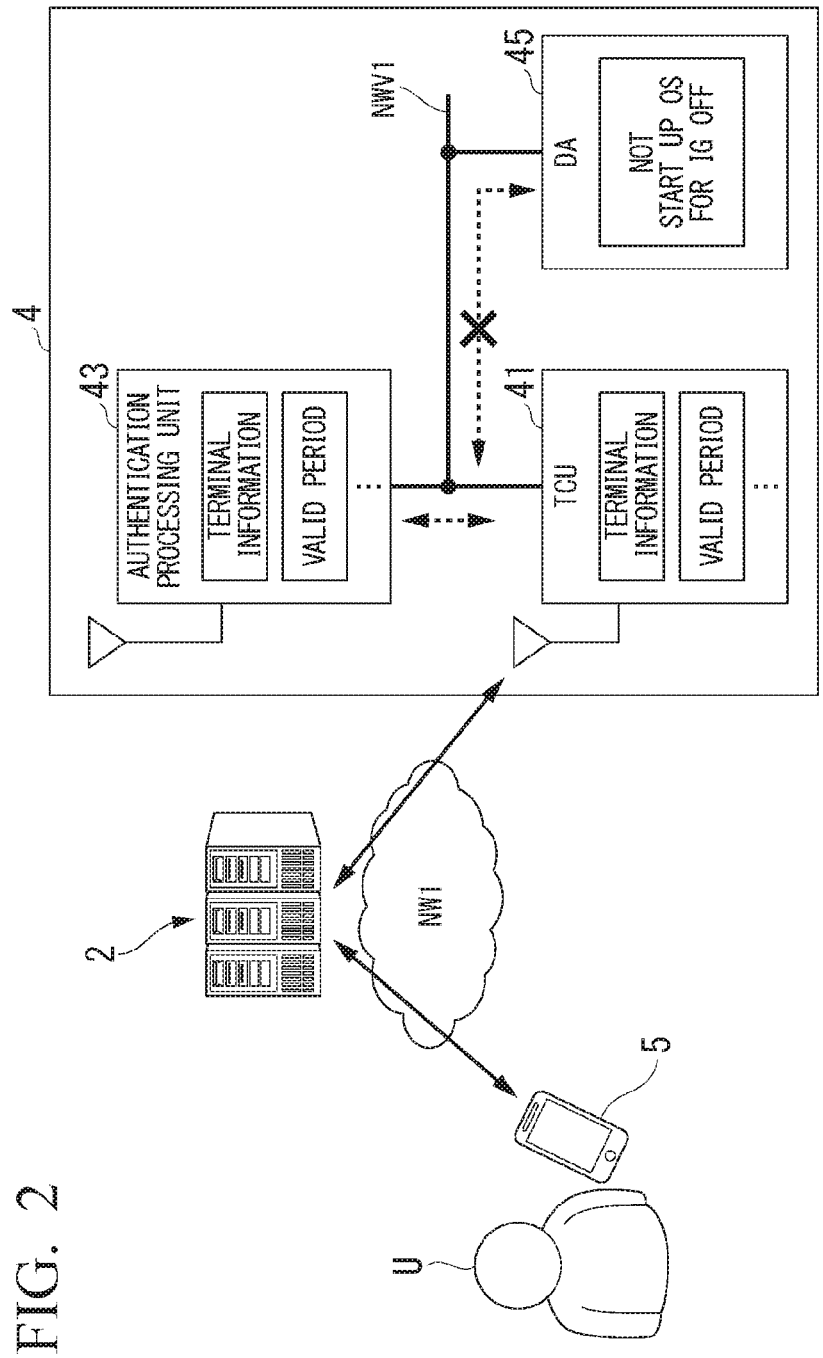
FIG. 2 is a diagram illustrating control of a display control device of the present embodiment.

Reference will be made to FIG. 2 to describe a state in which the display control device 45 is not activated. FIG. 2 is a diagram illustrating control of the display control device 45 of an embodiment. A functional unit hatched among functional units shown in FIG. 2 indicates that it is in a deactivated state. For example, the deactivated state refers to a state in which power is not supplied to the functional unit, and an operational system (OS) also does not function.

As described above, the process relating to issue of key data of the vehicle 3 is performed at any timing recognized as necessary by the user U regardless of the operating state of the vehicle 3. Therefore, the process relating to issue of key data may be performed in the state of IG_OFF.

The communication processing unit 41 and the authentication processing unit 43 shown in FIG. 2 are activated even in the state of IG_OFF, and transmit data acquired from the management device 2 to each unit within the display control device 45. Thereby, the authentication processing unit 43 can acquire the transmitted data. That is, the communication processing unit 41 and the authentication processing unit 43 can store data (including the terminal information, information of a valid period of key data, or the like) transmitted from the management device 2 in each storage unit.

On the other hand, the display control device 45 enters a deactivated state in a case of being in the state of IG_OFF.

Even in a case where data transmitted from the communication processing unit 41 is present during the state of IG_OFF, the display control device 45 is not able to acquire the data.

Consequently, the display control device 45 acquires the data which is not able to be acquired in a deactivated state through transmission from the authentication processing unit 43 or the like after entering an activated state. Thereby, even in a case where the state of the vehicle 3 is in any of the state of IG_ON and the state of IG_OFF, the display control device 45 can perform the second authentication process during IG_ON using information reported during the state of IG_OFF.

Figure 3:
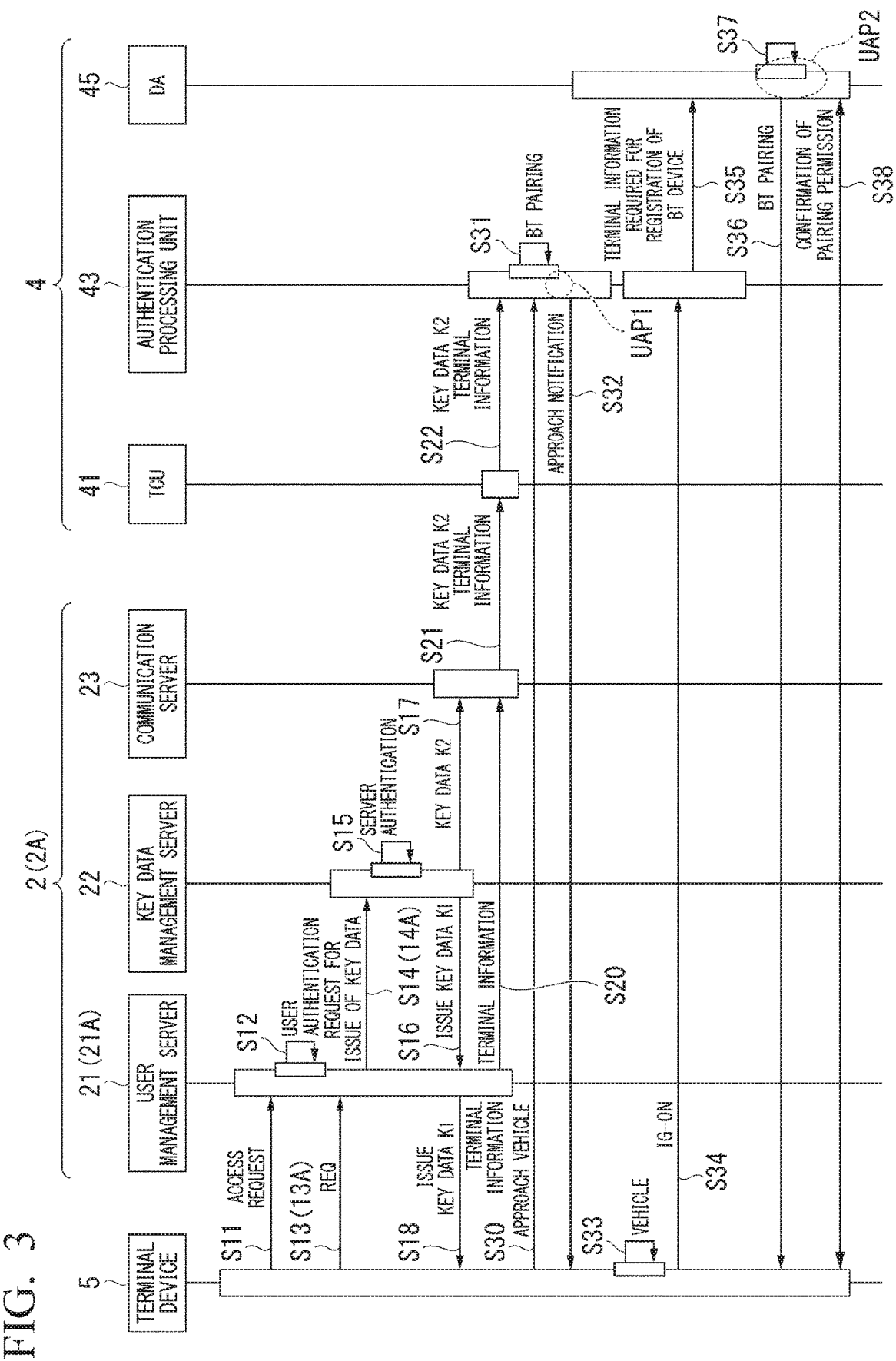
FIG. 3 is a sequence diagram illustrating an example of a flow of processes relating to communication of an embodiment.

FIG. 3 is a sequence diagram illustrating an example of a flow of processes relating to communication of an embodiment.

First, the terminal device 5 transmits a request (access request) relating to an entry to a system (step S11).

Next, the user management server 21 performs user authentication in accordance with an access request from the terminal device 5 (step S12), and replies to the access request. The terminal device 5 having obtained a reply sends a request REQ relating to a request for issue of key data of the vehicle 3 to the user management server 21 (step S13). The user management server 21 acquires the request REQ from the terminal device 5 that has succeeded in the user authentication, and sends the request for issue of key data to the key data management server 22 (step S14).

Meanwhile, in the case of the shared utility form, in steps S13 and S14, the request REQ in step S13 is replaced with a request relating to the reservation of the vehicle 3, and information relating to the presence or absence of use of HFT is included in the request (request REQ) relating to the reservation of the vehicle 3. In step S14, when the request REQ is acquired, the user management server 21 may search for a spare time in the use plan (use schedule) of the vehicle 3, and send the request for issue of key data to the key data management server 22 in a case where there is a spare time.

Next, the key data management server 22 acquires the request for issue of key data from the user management server 21, and performs server authentication of the user management server 21 (step S15).

The key data management server 22 transmits key data corresponding to the request for issue of key data, the key data K1 and the terminal information of the terminal device 5 to the user management server 21 through the server authentication, and notifies the user management server of the issue of the key data K1 (step S16). Further, the key data management server 22 transmits the key data K2 corresponding to the key data K1 to the communication server 23, and notifies the communication server of the issue of key data (step S17).

Next, the user management server 21 acquires the key data K1 issue notification, transmits the notification to the terminal device 5 (step S18), and transmits the terminal information of the terminal device 5 to the communication server 23 (step S20).

Next, the communication server 23 acquires the key data K2 from the key data management server 22, further acquires the terminal information of the terminal device 5 to the user management server 21, and transmits the above-described key data K2 and the terminal information of the terminal device 5 to the vehicle 3 (step S21).

Next, the communication processing unit 41 acquires the key data K2 and the terminal information of the terminal device 5 from the communication server 23, and transmits the data and information to the authentication processing unit 43 (step S22). The authentication processing unit 43 acquires the key data K2 and the terminal information of the terminal device 5 from the communication processing unit 41, and writes the data and information in the storage unit of the authentication processing unit 43.

The above is an example of a process which is performed in accordance with the request for issue of key data of the vehicle 3.

Thereafter, in a case where the user U approaches the vehicle 3, the terminal device 5 requests pairing for transmitting the key data K1 and the terminal information of the terminal device 5 to the vehicle 3 (step S30). The authentication processing unit 43 receives the request and performs a pairing process (step S31). For example, a method of this pairing process may comply with a BLE procedure.

Meanwhile, in the authentication processing unit 43, two types of communication standards may be adopted in communication with the terminal device 5. A first communication standard is based on a Bluetooth Basic Data Rate/Enhanced Data Rate (BR/EDR) procedure. A second communication standard is based on a Bluetooth Low Energy (BLE) procedure released to Bluetooth standard version 4.0 or lower. In a case where both are distinguished from each other in the following description, the former is simply called a "BT procedure", and the latter is simply called a "BLE procedure".

Depending on the BT procedure, a pairing process accompanying an operation of the user U is required in advance of communication. Meanwhile, depending on the BLE procedure, a pairing process accompanying an operation of the user U is not required.

Next, the authentication processing unit 43 performs the first authentication process UAP1 of the terminal device 5 that has transmitted a pairing request. First, the authentication processing unit 43 acquires the key data K1 and the terminal information of the terminal device 5 from the terminal device 5. The authentication processing unit 43 performs a determination according to a predetermined determination reference on the basis of the key data K2 and the terminal information of the terminal device 5 notified from the communication server 23 and the key data K1 and the terminal information notified from the terminal device 5. For example, the authentication processing unit 43 compares the key data K1 and K2 or the like on the basis of the first authentication process UAP1, and determines the terminal device 5 to be a communication destination on the basis of the result. The authentication processing unit 43 establishes the communication path CP1 between the terminal device 5 which is a pairing destination and the authentication processing unit on the basis of the result of the first authentication process UAP1, and transmits an approach notification to the terminal device 5 through the communication path CP1 (step S32). The terminal device 5 and the authentication processing unit 43 can communicate with each other through the process.

The authentication processing unit 43 unlocks the door of the vehicle 3 on the basis of the result of the first authentication process UAP1. The user U boards the vehicle 3 after the door is unlocked (step S33).

The user U performs an operation for starting up (IG_ON) the driving unit of the vehicle 3 (step S34). The authentication processing unit 43 acquires a request for startup, and notifies the display control device 45 of information required for registration of a BT device (step S35). The information required for registration of a BT device includes a UUID, a device name or the like. For example, this UUID is allocated for each application (service) of the simple pairing process functional unit 51 or the like.

The display control device 45 acquires the information required for registration of a BT device from the authentication processing unit 43, and starts a second authentication process UAP2 based on the acquired information. For example, first, the display control device 45 performs a pairing process based on the BT procedure with the detected terminal device 5 (step S36), registers identification information of a communication path in the storage unit 454 in association with the terminal device 5 when pairing with the terminal device 5 succeeds, and further exchanges a confirmation message of pairing permission with the terminal device 5 (step S38). Thereby, the communication path CP2 is formed.

The terminal device 5 and the display control device 45 can communicate with each other through the process.

Figure 4:
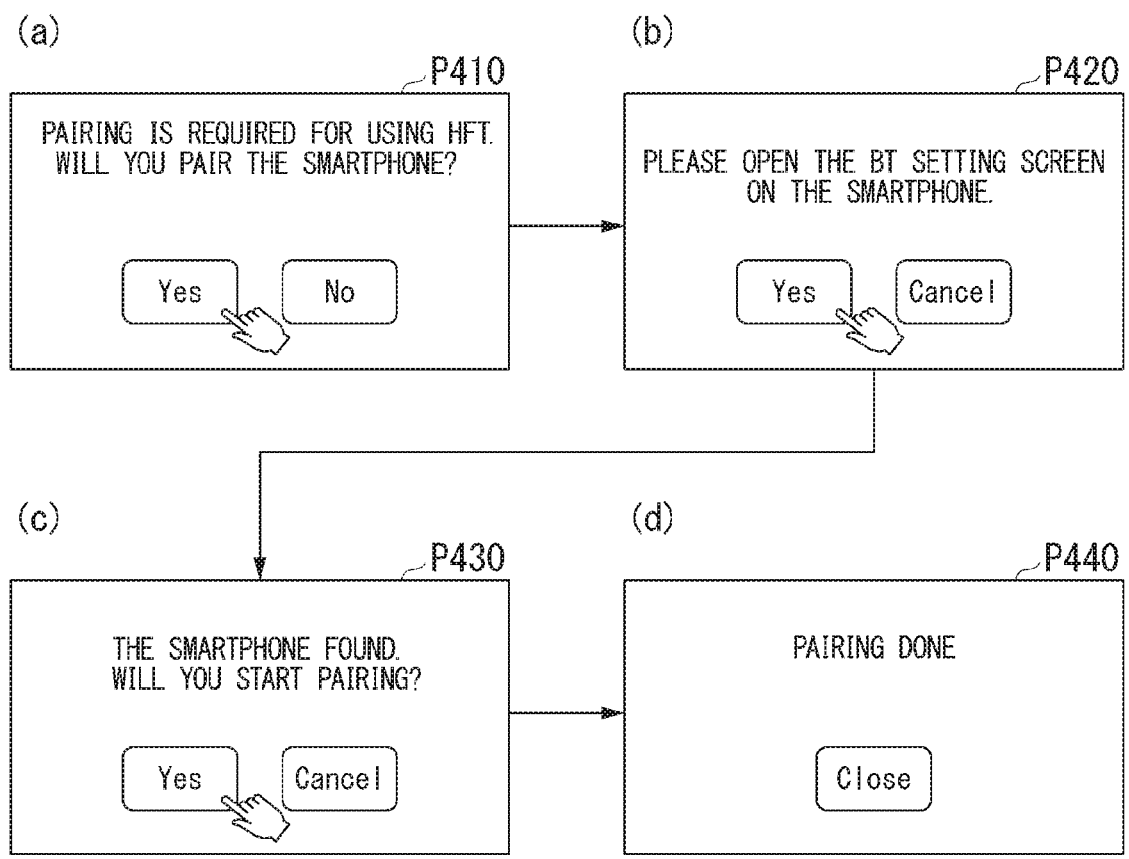
FIG. 4 is a diagram illustrating transition of a display screen displayed by a display unit during a pairing process of an embodiment.

Reference will be made to FIG. 4 to describe an example of a screen for the display control device 45 of an embodiment to cause the display unit 451 to perform display during the second authentication process UAP2. FIG. 4 is a diagram illustrating transition of a display screen displayed by the display unit 451 during a pairing process of an embodiment. The example of a display screen shown herein shows an example in a case where the number of terminal devices 5 to be paired is one.

A pairing necessity confirmation screen P410 is shown in (a) of FIG. 4, a display screen P420 of display for prompting an operation of the terminal device 5 is shown in (b) of FIG. 4, a start confirmation screen P430 of a pairing process is shown in (c) of FIG. 4, and a completion confirmation screen P440 of pairing process completion is shown in (d) of FIG. 4. Arrows that sequentially link (a) to (d) of FIG. 4 show the order of screen transition. The pairing necessity confirmation screen P410 shown in FIG. 4(*a*) displays a query such as "Pairing is required for using hands-free telephone function (HFT). Will you pair the smartphone?", and a "Yes" button and a "No" button for a reply to the query. The display screen P420 of display for prompting an operation of the terminal device 5 shown in (b) of FIG. 4 displays a notification such as "Please open the communication setting screen on the smartphone.", and a "Yes" button and a "Cancel" button for a response to the notification. The start confirmation screen P430 of a pairing process shown in (c) of FIG. 4 displays a query such as "The smartphone found. Will you start pairing?", and a "Yes" button and a "Cancel" button for a reply to the query. The completion confirmation screen P440 of pairing completion shown in FIG. 4(*d*) displays a notification such as "Pairing done", and a "Close" button for a response to the notification.

Needless to say, approval for a query is displayed as "Yes", and denial therefor is displayed as "No" or "Cancel", but other corresponding terms, symbols or the like may be used instead thereof.

Figure 5:
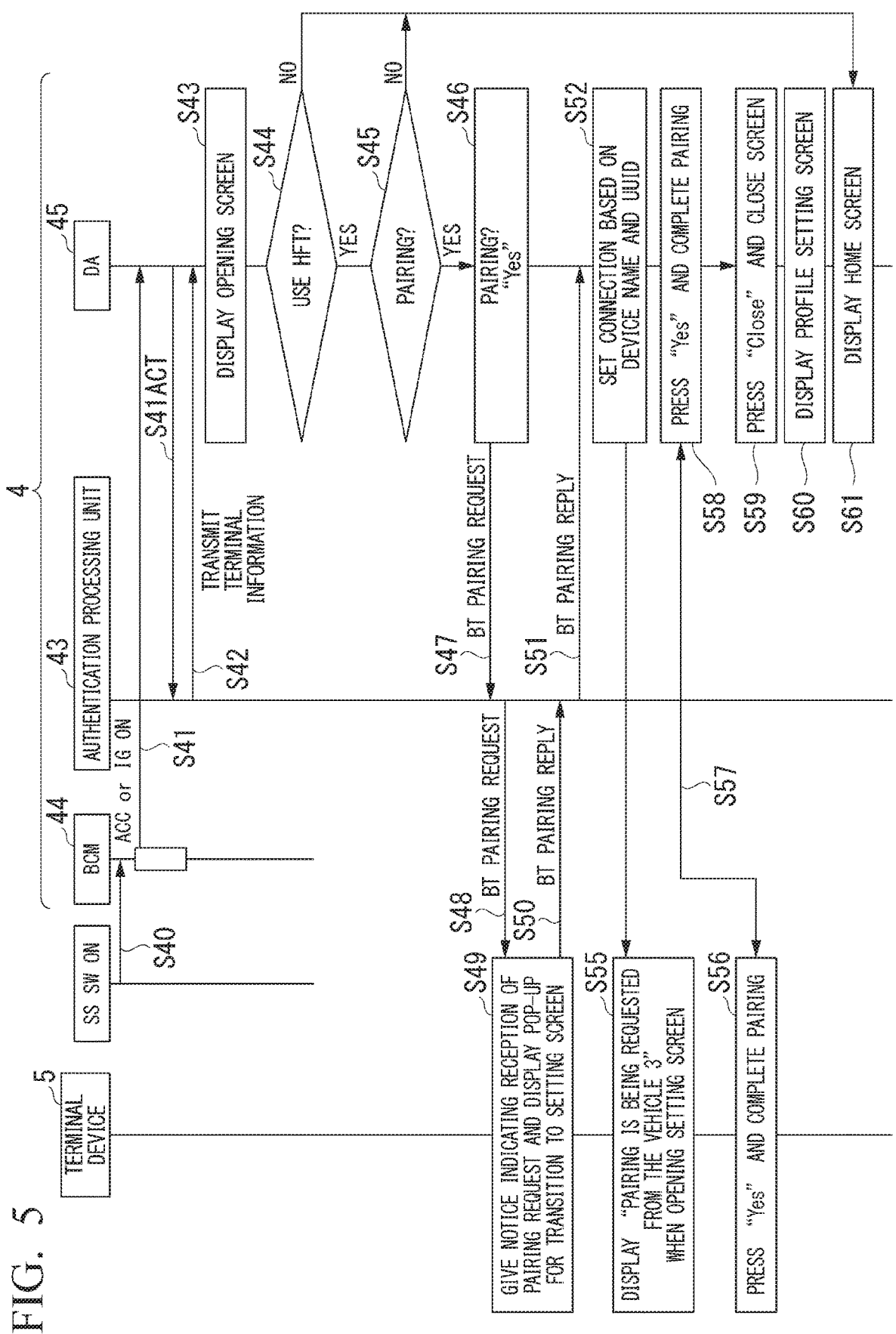
FIG. 5 is a sequence diagram illustrating an example of a flow of pairing processes in a second authentication process of the present embodiment.

Reference will be made to FIG. 5 to describe the details of a pairing process in the second authentication process UAP2 of an embodiment. FIG. 5 is a sequence diagram illustrating an example of a flow of pairing processes in the second authentication process of an embodiment.

It is presumed to be in a state described below at a point in time when the following procedure is started. For example, after the door of the vehicle 3 is unlocked, the user U boards the vehicle 3. The state of the start stop switch (SS_SW) of the vehicle 3 is in a state where the accessory function of the vehicle 3 is stopped.

In addition, the driving unit of the vehicle 3 or the display control device 45 is in a deactivated state, and the communication processing unit 41, the vehicle power supply control unit 44, and the authentication processing unit 43 are in an activated state.

In addition, a predetermined application program (virtual key management software) is installed in the terminal device 5, and the program is a usable state. The virtual key management software includes the simple pairing process functional unit 51 to be described later. For example, the simple pairing process functional unit 51 is located at a higher level than that of a function provided by an OS in a communication protocol of the terminal device 5, and uses a display function, a communication function, or the like provided by the OS.

The user U operates SS_SW of the vehicle 3 (step S40). By this operation, the state of SS_SW is changed to a state (state of ACC) in which the accessory of the vehicle 3 is activated or the state of IG_ON. The vehicle power supply control unit 44 detects a change to the state of ACC or the state of IG_ON, and starts electrical conduction to the display control device 45 to activate the display control device 45 (step S41). The display control device 45 executes an initialization process in the case of electrical conduction, and notifies the authentication processing unit 43 of transition to an activated state after the initialization process (step S41ACT).

The authentication processing unit 43 detects the transition of the display control device 45 to an activated state, and sends the terminal information of the terminal device 5 to the display control device 45 (step S42). Meanwhile, the terminal information of the terminal device 5 includes information used in automatic pairing, information required for processing device registration, or the like. The display control device 45 uses a pairing process to be described later, device registration, or the like using this terminal information.

The display control device 45 causes the display unit 451 to display an opening screen for a predetermined period (step S43). This display may include a notification such as an exemption item.

Next, the display control device 45 determines whether a hands-free telephone (HFT) function is used on the basis of the terminal information of the terminal device 5 notified from the authentication processing unit 43 (step S44). In a case where a specific function such as the hands-free telephone function realized in association with the terminal device 5 is not used, the display control device 45 causes the display unit 451 to display a predetermined display screen (such as a HOME screen) without performing a pairing process (step S60), and terminates a series of processes shown in FIG. 5.

Meanwhile, in a case where the hands-free telephone function is used, the display control device 45 causes the display unit 451 to display the pairing necessity confirmation screen P410 (step S45), and acquires a result of determination of its necessity performed by the user U. For example, in a case where the display control device 45 identifies that "No" is selected, the pairing process is not performed, and the process proceeds to step S60 described above.

In a case where it is identified by the determination of step S45 that "Yes" is selected (step S46), the display control device 45 transmits a pairing request (BT pairing request)

for establishing pairing based on the terminal device 5 and the BT procedure to the authentication processing unit 43 (step S47). The display control device 45 causes the display unit 451 to display the display screen P420 shown in (b) of FIG. 4 described above and prompts the operation of the terminal device 5. The display control device 45 identifies that "Cancel" is selected, the pairing process is not performed, and the process proceeds to step S60 described above.

Next, the authentication processing unit 43 transmits the BT pairing request for the terminal device 5 to the terminal device 5 (step S48).

Next, in a case where the terminal device 5 receives the signal (BT pairing request) transmitted from the vehicle instrument 4, the simple pairing process functional unit 51 receives a notification from the OS, and acquires the BT pairing request issued by the display control device 45 (step S49). The simple pairing process functional unit 51 transmits a pairing reply (BT pairing reply) including the terminal information in response thereto (step S50).

The authentication processing unit 43 acquires the BT pairing reply from the terminal device 5, and transmits the BT pairing reply to the display control device 45 (step S51).

The display control device 45 acquires the BT pairing reply from the authentication processing unit 43, and causes the display unit 451 to display the start confirmation screen P430 of a pairing process shown in FIG. 4(c). Here, the display control device 45 detects that the "Yes" button in the start confirmation screen P430 is pressed, and transmits a connection request based on the BT procedure on the basis of information (such as the UUID of the terminal device 5 or a device name) included in the BT pairing reply (step S52). Meanwhile, in a case where the display control device 45 identifies that "Cancel" is selected, the pairing process is not performed, and the process proceeds to step S60 described above.

In a case where the pairing request is transmitted by the display control device 45, each terminal device located in the vicinity of the display control device 45 inclusive of the terminal device 5 receives the pairing request (step S55-S59).

For example, first, the simple pairing process functional unit 51 detects the pairing request. In a case when a setting screen is opened by the operation of the user U, a notification such as "Pairing is being requested from the vehicle 3." And a "Close" button are displayed on the display unit of the terminal device 5 (step S55).

The simple pairing process functional unit 51 identifies an operation of the "Close" button performed by the user U (step S56), and communicates with the display control device 45 using information received from the display control device 45. The simple pairing process functional unit 51 sends a reply to the pairing request to the display control device 45 (step S57), and terminates a series of processes in the terminal device 5.

Next, in a case where the reply of the terminal device 5 to the pairing request is acquired, the display control device 45 causes the display unit 451 to display, for example, the completion confirmation screen P440 of a pairing process shown in (d) of FIG. 4 described above (step S58). The user U confirms that the completion confirmation screen P440 is displayed, and operates the "Close" button. The display control device 45 identifies this, and closes the completion confirmation screen P440 (step S59).

Next, the display control device 45 causes the display unit 451 to display a profile setting screen (step S60), subsequently accepts an operation including startup of the vehicle 3, performs a process in accordance therewith, and then causes the display unit 451 to display the HOME screen (step S61). A series of processes shown in FIG. 5 are terminated.

Meanwhile, according to the procedure shown in FIG. 5, the display control device 45 can make the terminal device 5 be in a state in which communication is possible in a series of processes shown in FIG. 5 regardless of the terminal device 5 being a BT device or a BLE device according to the BLE procedure.

According to the vehicle control system 1 of the embodiment, the authentication processing unit 43 determines whether the terminal device 5 of the user U registered as a user of the vehicle 3 in advance is present around or within the vehicle 3, and the control unit 455 causes the display unit 451 to output a screen for setting communication between the authentication processing unit 43 and the terminal device 5 in a case where it is determined by the authentication processing unit 43 that the terminal device 5 is present and the display unit 451 provided in the vehicle 3 is started up, whereby it is possible to make the terminal device 5 and the vehicle instrument 4 be in a state in which communication is possible in a simpler procedure.

For example, in a case where the user U uses a smartphone as the terminal device 5, UUID, a smartphone name (terminal name), or the like can be transmitted to the vehicle 3 beforehand using a communication function of the smartphone. When the user U boards the vehicle 3, and a car navigation function is started up in the display control device 45, the terminal device 5 to be paired with the display control device 45 is presumed to be identified. The display control device 45 causes both the display unit 451 and the display unit of the terminal device 5 to display a screen for prompting pairing with the terminal device 5 relatively quickly.

Each of the management device 2, the display control device 45, and the terminal device 5 is configured to include a processor such as a CPU, a semiconductor memory, or the like. At least a portion of each device may be realized by a software functional unit that functions by a processor such as a CPU executing a program, or all the devices may be realized by a hardware functional unit such as an LSI.

Meanwhile, the authentication processing unit 43 may acquire a result (specific result) obtained by specifying a terminal device that plans communication from other external devices (not shown) or the like, or may read and acquire data written in a storage medium such as, for example, an NFC card.

First Modification Example of First Embodiment

A first modification example of the first embodiment will be described below. FIG. 4 of the first embodiment shows a screen example in a case where BT pairing is performed on a specific terminal device. In the present modification example, instead thereof, in a case where the number of candidates to be paired is plural and pieces of terminal information thereof are stored in the storage unit 454, the plurality of terminal devices may be displayed within the same screen, and BT pairing may be performed on at least one terminal device among them.

FIG. 6 is a diagram illustrating transition of a display screen displayed by the display unit 451 during a pairing process of the first modification example of the first embodiment. The example of a display screen shown therein shows an example in a case where the number of candidates of the terminal device 5 to be paired is plural. A terminal device selection screen P700 is shown in (a) of FIG. 6, and a pairing necessity confirmation screen P710 is shown in (b) of FIG. 6.

The terminal device selection screen P700 shown in (a) of FIG. 6 displays guidance such as "Pairing is required for using hands-free telephone function (HFT). Please select a smartphone to be used.", and selection buttons of a plurality of terminal devices which are candidates to be paired in response to this guidance. Among the target candidates, for example, a plurality of terminal devices, that is, terminal devices 5-1 to 5-3 are included. The number of terminal devices displayed within this screen is arbitrary. The terminal devices which are candidates to be paired are large in number and are thus not able to be displayed within one screen, these terminal devices may be displayed by division into a plurality of screens.

For example, the user U selects a terminal device 5-1 that requests to be paired from the plurality of terminal devices displayed on the terminal device selection screen P700. The display control device 45 detects an operation of this selection, and then causes the display unit 451 to display the pairing necessity confirmation screen P710 shown in (b) of FIG. 6. The pairing necessity confirmation screen P710 displays guidance such as "Pairing is required for using hands-free telephone function (HFT).", display of "terminal device 5-1", a query such as "Will you pair this smartphone?", and a "Yes" button and a "No" button for a reply to the query.

The display control device 45 sets the terminal device 5-1 selected by the user U as a terminal device to be paired, and executes the pairing process with respect to the terminal device 5-1. For example, (b) to (d) of FIG. 4 described above are applied to display in the subsequent pairing process.

According to this modification example, it is possible to cause the user U to select a desired terminal device from among the plurality of terminal devices displayed on the display unit 451.

Meanwhile, according to the present modification example is applied to use of the owned utility form, when the user U uses the vehicle 3 using any of the plurality of terminal devices 5, it is possible to use the vehicle 3 by performing an operation for selecting a terminal device 5 to be used. In addition, according to the present modification example is applied to use of the shared utility form, it is possible to use the vehicle 3 by performing an operation for selecting a terminal device 5 to be used by a user when using the vehicle 3.

As described above, the procedure of pairing between the terminal device 5 and the display control device 45 is simplified. Further, once the terminal device 5 and the display control device 45 are paired with each other, these devices are automatically paired with each other from then on. In use of a rental car or car sharing necessary to appropriately switch a combination of the vehicle 3 and the terminal device 5, pairing between the terminal device 5 and the display control device 45 occurs frequently, and thus a vehicle control system 1A that makes it possible to simplify a procedure of pairing is suitable for the above use.

Second Modification Example of First Embodiment

A second modification example of the first embodiment will be described. As shown in FIG. 3 or the like, the management device 2 of an embodiment individually notifies the vehicle 3 of key data of a specific terminal device during a reservation to use the vehicle 3. In the present modification example, during a reservation to use the vehicle 3, the management device 2 does not individually notify the vehicle 3 of key data which is a specific result of a terminal device, and holds the key data for a predetermined period. Thereafter, in a case where predetermined conditions are satisfied, a management device 2A may send the held data to a vehicle collectively.

For example, the predetermined conditions may be set on the basis of a time (period) determined in advance.

In addition, for example, the management device 2 may send the held data to a vehicle collectively in accordance with a request from the vehicle 3. In this case, at a point in time when the state of IG_ON of the vehicle 3 is detected, the vehicle instrument 4 requests an offer of data (such as key data) relating to the vehicle 3 from the management device 2, and acquires the data held by the management device 2. Thereby, the vehicle instrument 4 can acquire the data held by the management device 2A at a point in time when IG_ON is detected.

Second Embodiment

In a vehicle control system 1A of a second embodiment, a display control device 45A directly communicates with the terminal device 5 without going through an authentication processing unit 43A with respect to communication with the terminal device 5 subsequent to the second authentication process. The same components as those of the first embodiment are denoted by the same reference numerals and signs. Hereinafter, a description will be given with focus on differences from the first embodiment.

Figure 7:
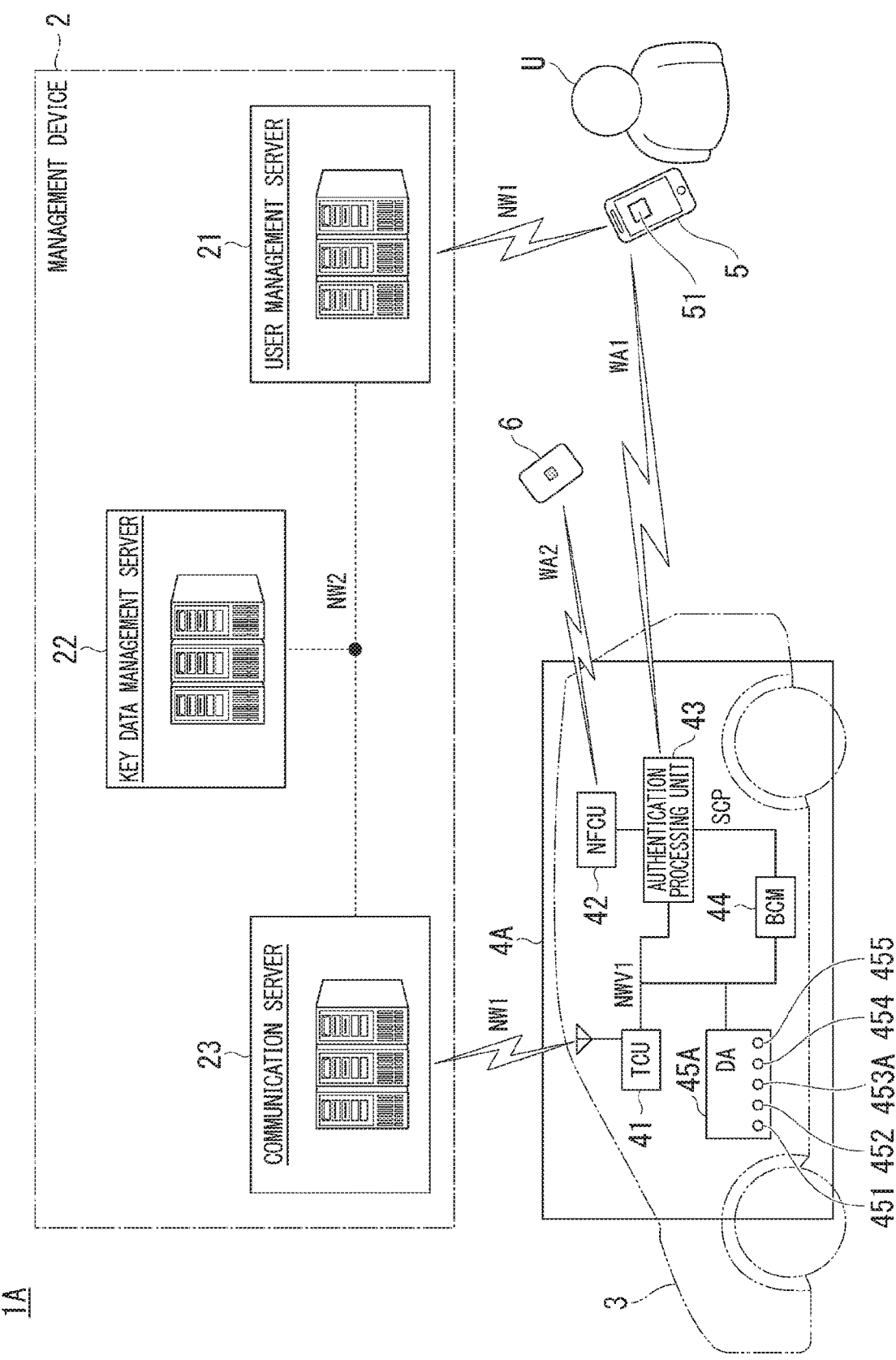
FIG. 7 is a configuration diagram of a vehicle control system including a vehicle control device according to a second embodiment.

FIG. 7 is a configuration diagram of a vehicle control system including a vehicle control device according to the second embodiment.

The vehicle control system 1A includes the management device 2, a vehicle instrument (an example of a vehicle control device) 4A mounted in the vehicle 3, and the terminal device 5.

The vehicle instrument 4A includes, for example, the communication processing unit 41, the NFC communication processing unit 42, the authentication processing unit 43A (terminal device authentication unit), the vehicle power supply control unit 44, and the display control device 45A.

The authentication processing unit 43A corresponds to the above-described authentication processing unit 43 (FIG. 1), but may not function as a communication interface of communication of the terminal device 5 performed by the display control device 45A subsequent to the second authentication process.

The display control device 45A includes the display unit 451, the operating unit 452, a communication unit 453A, the storage unit 454, and a control unit 455A.

The communication unit 453A includes a wireless communication function unit for using the wireless communication WA1 in addition to the above-described communication unit 453 (FIG. 1). The communication unit 453A communicates directly with the terminal device 5 subsequent to the second authentication process.

The control unit 455A controls each unit of the display control device 45A, further communicates with the terminal device 5 through the communication unit 453A, and writes data acquired from the terminal device 5 in the storage unit 454.

The control unit 455A forms a communication path CP2A using the wireless communication WA1 between the terminal device 5 and the control unit using the communication unit 453A.

The display control device 45A acquires information used in the second authentication process of the terminal device 5 in advance from the authentication processing unit 43A, and performs the second authentication process on the terminal device 5. In a case where the terminal device 5 registered in the storage unit 454 in advance is identified through the second authentication process, the display control device 45A then acquires a request relating to startup of the vehicle 3 from the terminal device 5, and starts up the vehicle 3 in accordance with the request.

Figure 8:
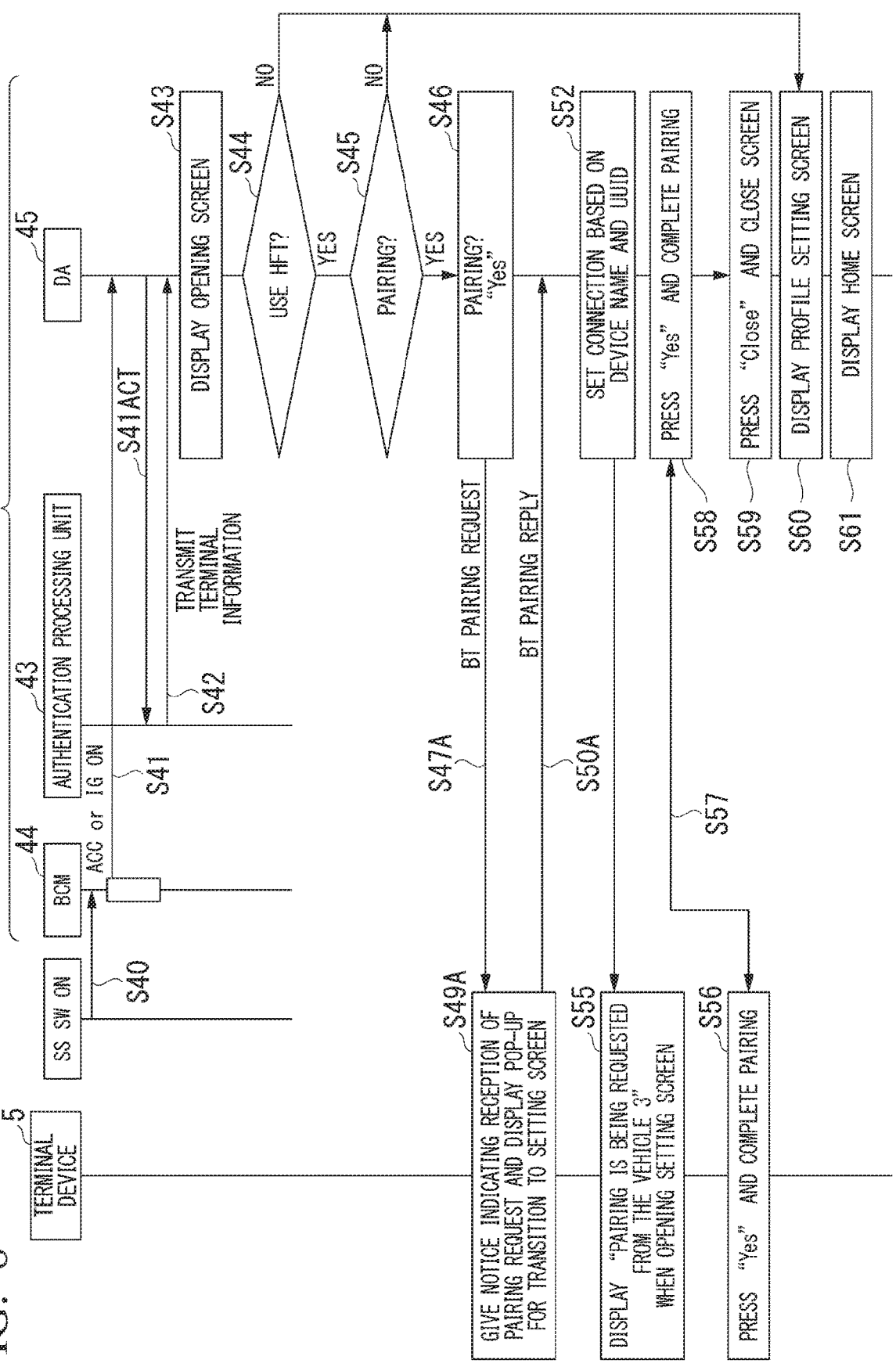
FIG. 8 is a sequence diagram illustrating an example of a flow of pairing processes in a second authentication process of the present embodiment.

Reference will be made to FIG. 8 to describe the details of a pairing process in the second authentication process of an embodiment. FIG. 8 is a sequence diagram illustrating an example of a flow of pairing processes in the second authentication process of an embodiment. The sequence diagram shown in FIG. 8 corresponds to the sequence diagram shown in FIG. 5 described above. The processes of steps S40 to S46 and step S55 and the subsequent steps are the same as those in FIG. 5 described above.

In a case where it is identified by the determination of step S45 that "Yes" is selected, the display control device 45 transmits a request for pairing (BLE pairing request) with the terminal device 5 from the communication unit 453A to the terminal device 5 (step S47A). The display control device 45A causes the display unit 451 to display the display screen P420 shown in (b) of FIG. 4 described above, and does not perform the pairing process in a case where it is identified that "Cancel" is selected. The process proceeds to step S60 described above.

Next, the simple pairing process functional unit 51 acquires the BLE pairing request (step S49A). The simple pairing process functional unit 51 transmits a BLE pairing reply in response thereto (step S50A).

The display control device 45 acquires the BLE pairing reply from the terminal device 5, and causes the display unit 451 to display the start confirmation screen P430 shown in (c) of FIG. 4. Here, the display control device 45A detects that the "Yes" button in the start confirmation screen P430 is pressed, and transmits a connection request based on the BLE procedure to the terminal device 5 on the basis of information included in the BLE pairing reply (step S52A). Thereby, the communication path CP2A is formed.

According to the embodiment, the display control device 45A in which the communication unit 453A that communicates directly with the terminal device 5 exhibits the same effect as that in the first embodiment. The display control device 45A can communicate with the terminal device 5 having succeeded in the first authentication process by using the result of the first authentication process when BLE pairing with the terminal device 5 is performed.

Meanwhile, in the embodiment, an example in which the display control devices 45 and 45A pair the terminal device 5 using Bluetooth has been exemplified, but communication of the terminal device 5 may be authenticated using communication of a wireless local area network (LAN) type such as Wi-Fi (registered trademark) instead of Bluetooth. For example, the display control device 45 is assumed to be a device having a function as an access point of wireless LAN communication. In this case, the authentication processing unit 43 sends a service set identifier (SSID) and a password required to perform wireless LAN communication with the display control device 45 to the terminal device 5, and thus the terminal device 5 can communicate with the display control device 45 through wireless LAN connection using the SSID and the password. The vehicle control system 1 is configured as described above, whereby it is possible to use an authentication function of wireless LAN instead of pairing using Bluetooth. While preferred embodiments of the invention have been described and illustrated above, it should be understood that these are exemplary of the invention and are not to be considered as limiting. Additions, omissions, substitutions, and other modifications can be made without departing from the spirit or scope of the present invention.

For example, in addition to a case where a hands-free telephone function is used, the processes of the embodiments can also be applied to a case where other functions are used using application software for performing a music reproduction process or the like, various application software of the terminal device 5, or the like.

In addition, the screen displays shown in FIGS. 4 and 6 may be simply replaced by display such as "Will you perform Bluetooth pairing?" or display such as "Will you perform pairing in order to listen to music?".

What is claimed is:

1. A vehicle control device comprising: a memory that stores computer executable units; and a processor that executes the computer executable units stored in the memory, wherein the computer executable units comprise: a terminal device authentication unit configured to determine whether a terminal device of a user registered as a user of a vehicle in advance is present around or within the vehicle; a communication unit configured to communicate with the terminal device; and a control unit configured to cause a display device provided in the vehicle to output a screen for setting communication between the communication unit and the terminal device in a case where it is determined by the terminal device authentication unit that the terminal device is present and the display device is started up, wherein the terminal device authentication unit determines that authentication of the terminal device has succeeded in a case where first key data acquired from the terminal device and second key data acquired from a management device are coincident with each other, wherein the control unit causes a storage unit to store information relating to the terminal device of a user of the vehicle acquired from the management device or the terminal device, and causes the display device provided in the vehicle to output a screen for setting communication with the terminal device, corresponding to information relating to terminal information read out from the storage unit, to the corresponding terminal device in a case where it is determined by the terminal device authentication unit that the terminal device is present and the display device is started up, and wherein the control unit deletes the terminal information of the terminal device, displayed on the display device from the storage unit, on the basis of information indicating that a user's right to use the terminal device acquired from the management device is invalidated.

2. The vehicle control device according to claim 1, wherein the terminal device authentication unit authenticates the terminal device in a case where the terminal device authentication unit and the terminal device are present within a predetermined distance.

3. The vehicle control device according to claim 1, wherein the communication unit is started up in a case where it is determined by the terminal device authentication unit that the authentication of the terminal device has succeeded, and communicates with the terminal device.

4. The vehicle control device according to claim 1, wherein in a case where the authentication has succeeded, the terminal device authentication unit transmits information required for setting communication between the communication unit and the terminal device, acquired from the management device or the terminal device, to the control unit.

5. The vehicle control device according to claim 1, wherein the terminal device authentication unit acquires the information relating to a terminal device of a user of the vehicle, registered on the basis of request from a user in the management device, from the management device, and causes the storage unit to store the acquired information.

6. The vehicle control device according to claim 1, wherein the management device manages data relating to a schedule to use the vehicle, the information relating to the terminal information includes the managed data relating to a schedule to use the vehicle, and in a case where it is determined by the terminal device authentication unit that the terminal device is present and the display device provided in the vehicle is started up, the control unit extracts terminal information in which a range until an elapse of a predetermined period from the startup overlaps a period of a reservation to use the vehicle from the terminal information read out from the storage unit, and causes the display device to output a screen for setting communication with a terminal device, corresponding to information relating to the extracted terminal information, to the corresponding terminal device.

7. The vehicle control device according to claim 1, wherein the display device and the control unit are provided in a display control device of the vehicle, and the display control device and the terminal device can communicate with each other through a process where the control unit performs an authentication by executing a pairing processing after the screen for setting communication is output on the display device.

8. A non-transitory computer-readable recording medium storing a program causing a terminal device capable of communicating with a vehicle to transmit first key data to an instrument of the vehicle with approach to the vehicle, and causing a terminal display unit of the terminal device to output a screen for setting communication between a display control device and the terminal device on the basis of authentication success information obtained in accordance with transmission of the first key data, causing the terminal display unit to output the screen for setting communication between the display control device and the terminal device, corresponding to information related to terminal information read out from a storage unit of the vehicle, to the corresponding terminal device in a case where it is determined that the terminal device is present and the display device is started up, and causing the terminal display unit to delete the terminal information on the terminal display unit on the basis of receipt of information indicating that a user's right to use the terminal device is invalidated.

* * * * *